(12) United States Patent
Tominaga et al.

(10) Patent No.: US 8,453,605 B2
(45) Date of Patent: Jun. 4, 2013

(54) SYSTEM FOR FEEDING AQUATIC ORGANISMS AND CLEANING UNIT FOR WATER TANK

(75) Inventors: Kazutoshi Tominaga, Osaka (JP); Ryuzo Arita, Osaka (JP)

(73) Assignee: Kabushiki Kaisha Tominaga Jyushi Kogyosho, Higashiosaka-shi, Osaka (JP)

( * ) Notice: Subject to any disclaimer, the term of this patent is extended or adjusted under 35 U.S.C. 154(b) by 99 days.

(21) Appl. No.: 12/736,908

(22) PCT Filed: May 19, 2009

(86) PCT No.: PCT/JP2009/059189
§ 371 (c)(1), (2), (4) Date: Mar. 18, 2011

(87) PCT Pub. No.: WO2009/142202
PCT Pub. Date: Nov. 26, 2009

(65) Prior Publication Data
US 2011/0162585 A1    Jul. 7, 2011

(30) Foreign Application Priority Data
May 21, 2008    (JP) .................................. 2008-132670

(51) Int. Cl.
*A01K 63/04* (2006.01)
(52) U.S. Cl.
USPC ....................................... 119/259; 210/416.2
(58) Field of Classification Search
USPC ................. 119/245, 248, 251, 259, 260, 261, 119/262; 210/416.2, 167.21
See application file for complete search history.

(56) References Cited

U.S. PATENT DOCUMENTS

| | | | | |
|---|---|---|---|---|
| 3,232,271 | A | * | 2/1966 | De Jose Guadalupe Dosamantes et al. .............................. 119/262 |
| 3,292,579 | A | * | 12/1966 | Buchanan ..................... 119/245 |
| 3,683,177 | A | * | 8/1972 | Veloz ............................. 250/435 |
| 3,797,459 | A | * | 3/1974 | Harris ........................... 119/245 |
| 4,691,459 | A | * | 9/1987 | Butler ............................. 40/406 |
| 4,844,013 | A | * | 7/1989 | de Haan et al. ............... 119/248 |

(Continued)

FOREIGN PATENT DOCUMENTS

| | | |
|---|---|---|
| EP | 1 606 996 | 12/2005 |
| GB | 2 226 940 | 7/1990 |

(Continued)

OTHER PUBLICATIONS

International Search Report.

(Continued)

*Primary Examiner* — Rob Swiatek
*Assistant Examiner* — Ebony Evans
(74) *Attorney, Agent, or Firm* — Collard & Roe, P.C.

(57) ABSTRACT

An aquarium system for aquatic organisms easily performs maintenance of a purifying device and a circulation pump and downsizes a purifying zone. The system includes an aquarium, a partition wall dividing the aquarium into a nurturing zone and a purifying zone, a circulation pump for circulating water between the nurturing zone and the purifying zone, and a purifying device selected from a filter for filtering water by making the water pass through a filtering material, a protein skimmer for removing proteins contained in the water by making the proteins adhere to air bubbles, and an ultraviolet light irradiator for sterilizing the water by irradiating ultraviolet light to the water. The circulation pump and the purifying device are mounted on a mounting frame and are accommodated in the purifying zone in a removably inserted manner.

7 Claims, 17 Drawing Sheets

U.S. PATENT DOCUMENTS

| | | | |
|---|---|---|---|
| 5,171,438 A | 12/1992 | Korcz | |
| 5,172,650 A * | 12/1992 | Hsu et al. | 119/259 |
| 5,197,409 A * | 3/1993 | Hammond | 119/253 |
| 5,306,421 A | 4/1994 | Weinstein | |
| 5,427,060 A * | 6/1995 | Kikuta | 119/248 |
| 6,840,192 B1 * | 1/2005 | Pagano | 119/254 |
| 7,022,227 B1 | 4/2006 | Liao | |
| 7,578,262 B2 * | 8/2009 | Vaccari | 119/259 |

FOREIGN PATENT DOCUMENTS

| | | |
|---|---|---|
| GB | 2 239 402 | 7/1991 |
| JP | 2-186928 | 7/1990 |
| JP | 9-163895 | 6/1997 |
| JP | 10-286301 | 10/1998 |
| JP | 2001-017023 | 1/2001 |
| JP | 2004-016168 | 1/2004 |
| JP | 3-122543 | 6/2006 |

OTHER PUBLICATIONS

Supplementary European Search Report dated Nov. 23, 2012 in European Patent Application No. EP 09 75 0564.

\* cited by examiner

SYSTEM FOR FEEDING AQUATIC ORGANISMS AND CLEANING UNIT FOR WATER TANK

CROSS REFERENCE TO RELATED APPLICATIONS

This application is the National Stage of PCT/JP2009/059189 filed on May 19, 2009, which claims priority under 35 U.S.C. §119 of Japanese Application No. 2008-132670 filed on May 21, 2008, the disclosure of which is incorporated by reference. The international application under PCT article 21(2) was not published in English.

TECHNICAL FIELD

The present invention relates to, for example, an internal purification type aquarium system for aquatic organisms in which a purification device, such as, e.g., a filter, is disposed in an aquarium, and also relates to a purification unit for use in an aquarium.

BACKGROUND ART

When nurturing aquarium fish in an aquarium, a filtration device is normally disposed to keep the water in the aquarium clean.

As a system for filtering water in an aquarium, for example, an external filtration system in which a filtration device is disposed separately from the aquarium, and an internal filtration system in which a filtration device is mounted in an aquarium are well-known.

For example, as shown in Patent Documents 1 and 2 listed below, in an internal filtration type aquarium system for aquarium fish, an inside of the aquarium is divided into a nurturing zone and a filtering zone. Furthermore, the filtering zone is divided into a plurality of water passage chambers which are in communication with each other, and various components, such as, e.g., a filtering material, a circulation pump, and a pipe, are accommodated in each water passage chamber.

PRIOR ART DOCUMENT

Patent Document

Patent Document 1: U.S. Pat. No. 5,306,421 (FIGS. 1 and 6)
Patent Document 2: U.S. Pat. No. 5,171,438 (FIGS. 1 and 2)

SUMMARY OF THE INVENTION

Problems to be Solved by the Invention

In the conventional internal filtration type aquarium system as shown in the aforementioned Patent Documents 1 and 2, a number of components, such as, e.g., a circulation pump, a plurality of filtering materials, and pipes, are accommodated in the filtering zone. In such an aquarium system, when a user exchanges the filtering materials or conducts maintenance of the pump and/or the pipes, it is required for the user to insert his/her hand in the filtering zone and take out predetermined components from the aquarium after releasing engagement of the predetermined components to their peripheral components. For this reason, it is required to provide a working space for removing and inserting components in the filtering zone, in addition to amounting space for mounting components. This increases the filtering zone in size, which in turn causes enlargement of the entire aquarium system.

If the working space in the filtering zone is reduced, operations for removing and inserting components become difficult, which makes it difficult to perform the maintenance work and the like.

The preferred embodiments of the present invention have been developed in view of the above-mentioned and/or other problems in the related art. The preferred embodiments of the present invention can significantly improve upon existing methods and/or apparatuses.

The present invention was made in view of the abovementioned problems, and aims to provide an aquarium system for aquatic organisms and an aquarium purification unit capable of easily performing maintenance of, e.g., the purification device and the circulation pump, and also capable of reducing the size of the purifying zone such as the filtering zone.

Other aims and advantages of the present invention will be clear from the following preferred embodiments.

Means for Solving the Problems

To achieve the aforementioned purpose, the present invention has the following structure.

[1] An aquarium system for aquatic organisms, comprising:
an aquarium;
a partition wall arranged to divide an inside of the aquarium into a nurturing zone and a purifying zone;
a circulation pump arranged to circulate water between the nurturing zone and the purifying zone; and
at least one purifying device selected from a filter for filtering water by making the water pass through a filtering material, a protein skimmer for removing proteins contained in the water by making the proteins adhere to air bubbles, and an ultraviolet light irradiator for sterilizing the water by irradiating ultraviolet light to the water,
wherein the circulation pump and the at least one purifying device constitute a unit member,
wherein the unit member is mounted on a mounting frame to thereby form a purification unit, and
wherein the purification unit is accommodated in the purifying zone in a removably inserted manner in a state in which the unit member is mounted on the mounting frame.

[2] The aquarium system for aquatic organisms as recited in the aforementioned Item 1, wherein the unit member includes the protein skimmer and a skimmer pump for supplying air bubble mixed water to the protein skimmer.

[3] The aquarium system for aquatic organisms as recited in the aforementioned Items 1 or 2, wherein the mounting frame is constituted by a casing configured to accommodate the unit member in a removably inserted manner.

[4] The aquarium system for aquatic organisms as recited in any one of the aforementioned Items 1 to 3, wherein the purification unit is accommodated in at least a part of the purifying zone in a fitted manner.

[5] The aquarium system for aquatic organisms as recited in any one of the aforementioned Items 1 to 4, wherein the unit member includes the filter and the protein skimmer.

[6] The aquarium system for aquatic organisms as recited in any one of the aforementioned Items 1 to 5, wherein the unit member includes all members disposed in the purifying zone.

[7] The aquarium system for aquatic organisms as recited in any one of the aforementioned Items 1 to 6, wherein the mounting frame is provided with a wiring/tubing accommodation groove formed on an outer surface of the mounting frame and extended from the purifying zone to an upper edge portion of the aquarium, and wherein a power cord is accommodated in the wiring/tubing accommodation groove and taken out from the purifying zone to an outside of the aquarium.

[8] An aquarium purifying unit to be disposed in a purifying zone of an aquarium, wherein the aquarium is divided by a partition wall into a nurturing zone and the purifying zone, the aquarium purifying unit comprising:

a unit member including a circulation pump configured to circulate water between the nurturing zone and the purifying zone, and at least one purifying device selected from a filter for filtering water by making the water pass through a filtering material, a protein skimmer for removing proteins contained in the water by making the proteins adhere to air bubbles, and an ultraviolet light irradiator for sterilizing the water by irradiating ultraviolet light to the water; and a mounting frame configured to mount the unit member, wherein the aquarium purifying unit is configured such that the aquarium purifying unit is accommodated in the purifying zone in a removably inserted manner in a state in which the unit member is mounted on the mounting frame.

EFFECTS OF THE INVENTION

According to the aquarium system for aquatic organisms of the invention [1], the dead space in the purifying unit can be reduced and the purifying unit and purifying zone can be reduced in size because the purification unit mounting the unit member such as the purifying device and the circulation pump on the mounting frame is accommodated in the purifying zone in a removably inserted manner. Furthermore, at the time of performing the maintenance of the unit member, by pulling out the purification unit from the purifying zone, any desired components can be assuredly removed, which enables assured maintenance work thereof.

According to the aquarium system for aquatic organisms of the invention [2], the aforementioned effects can be obtained assuredly.

According to the aquarium system for aquatic organisms of the invention [3], since the unit member is accommodated in the casing, downsizing of the purification unit can be attained assuredly.

According to the aquarium system for aquatic organisms of the invention [4], downsizing of the purifying zone can be attained assuredly.

According to the aquarium system for aquatic organisms of the inventions [5] and [6], the abovementioned effects can be obtained even more assuredly.

According to the aquarium system for aquatic organisms of the invention [7], the power cord for the pump constituting the filtration unit can be smoothly taken out to the outside of the aquarium.

According to the purification unit for an aquarium of the invention [8], in the same manner as mentioned above, downsizing can be attained and the maintenance work for the unit member can be performed assuredly.

BEST MODE FOR CARRYING OUT THE INVENTION

Figure 1:
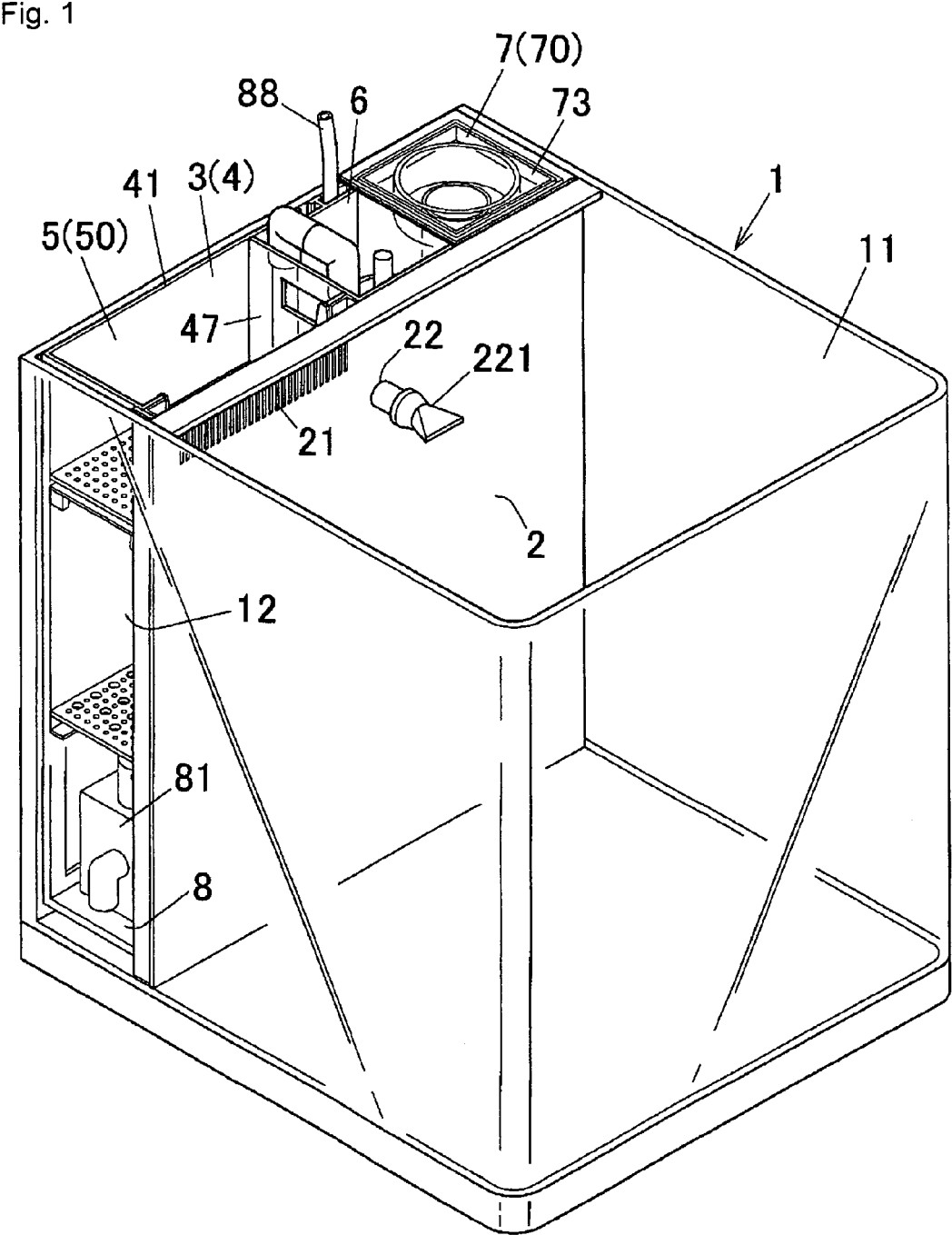
FIG. 1 is a perspective view showing an aquarium system for aquatic organisms according to an embodiment of the present invention.
Figure 2:
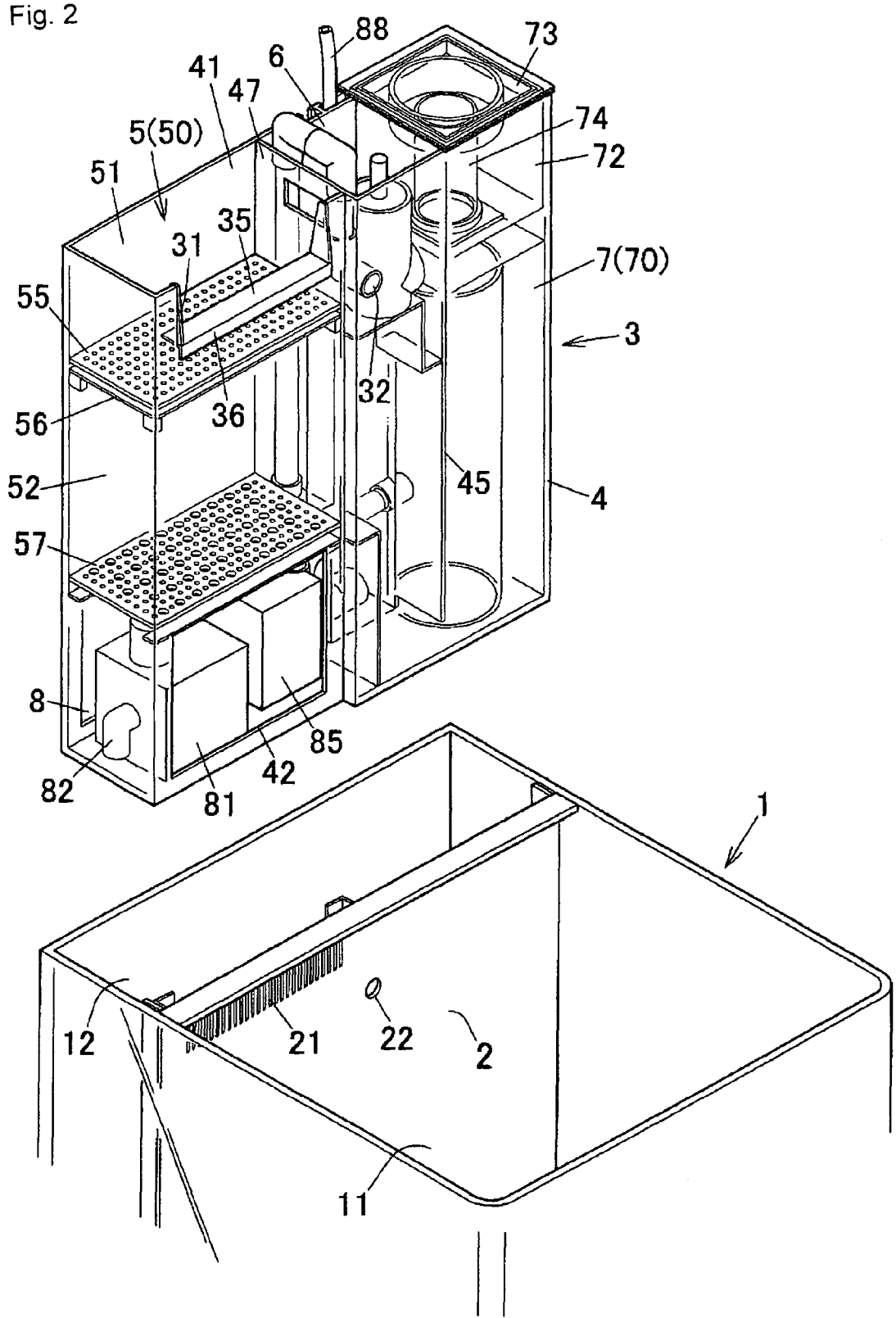
FIG. 2 is a perspective view showing the aquarium system for aquatic organisms in a state in which the filtration unit is detached according to the embodiment.

FIGS. 1 and 2 show an aquarium system for aquatic organisms according to an embodiment of the present invention. As shown in both figures, the aquarium system has a filtering function of circulating seawater while filtering so that the system can assuredly nurture marine organisms/organisms, such as, e.g., invertebrates including coral reef, jellyfish, and crustacean, as well as vertebrates including saltwater fish, for a long period of time.

This aquarium system for aquatic organisms is equipped with an aquarium (water tank) 1. At the rear portion of the aquarium 1, a partition wall 2 is attached. The partition wall 2 is disposed vertically to divide the inside of the aquarium 1 into front and rear sections. A nurturing zone 11 is constituted by the front side region in the aquarium 1 partitioned by the partition wall 2, and a filtering zone 12 as a purification zone is constituted by the rear side region in the aquarium 1 partitioned by the partition wall 2.

Figure 13:
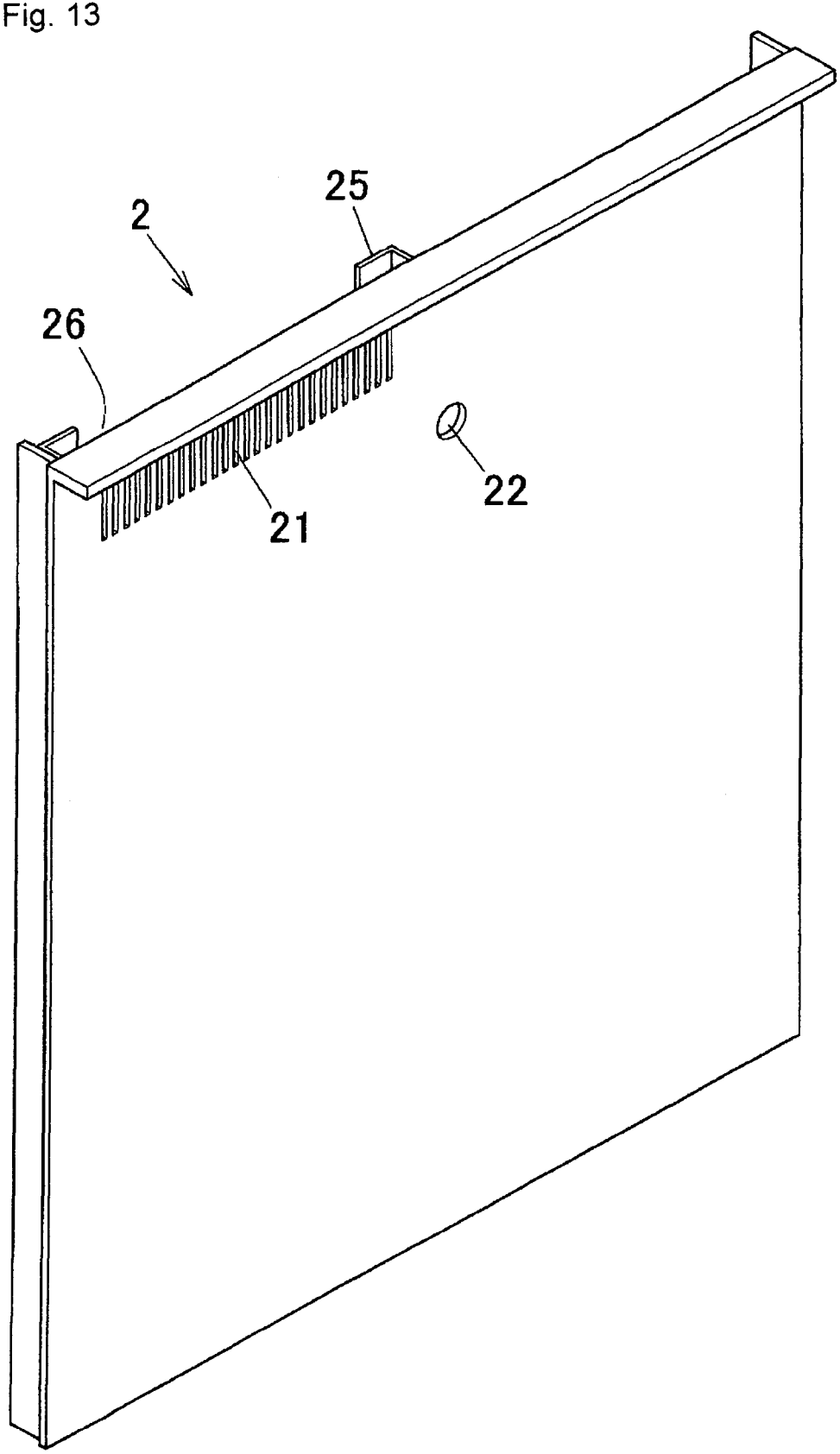
FIG. 13 is a front side perspective view showing the partition wall applied to the embodiment of the aquarium system for aquatic organisms.
Figure 14:
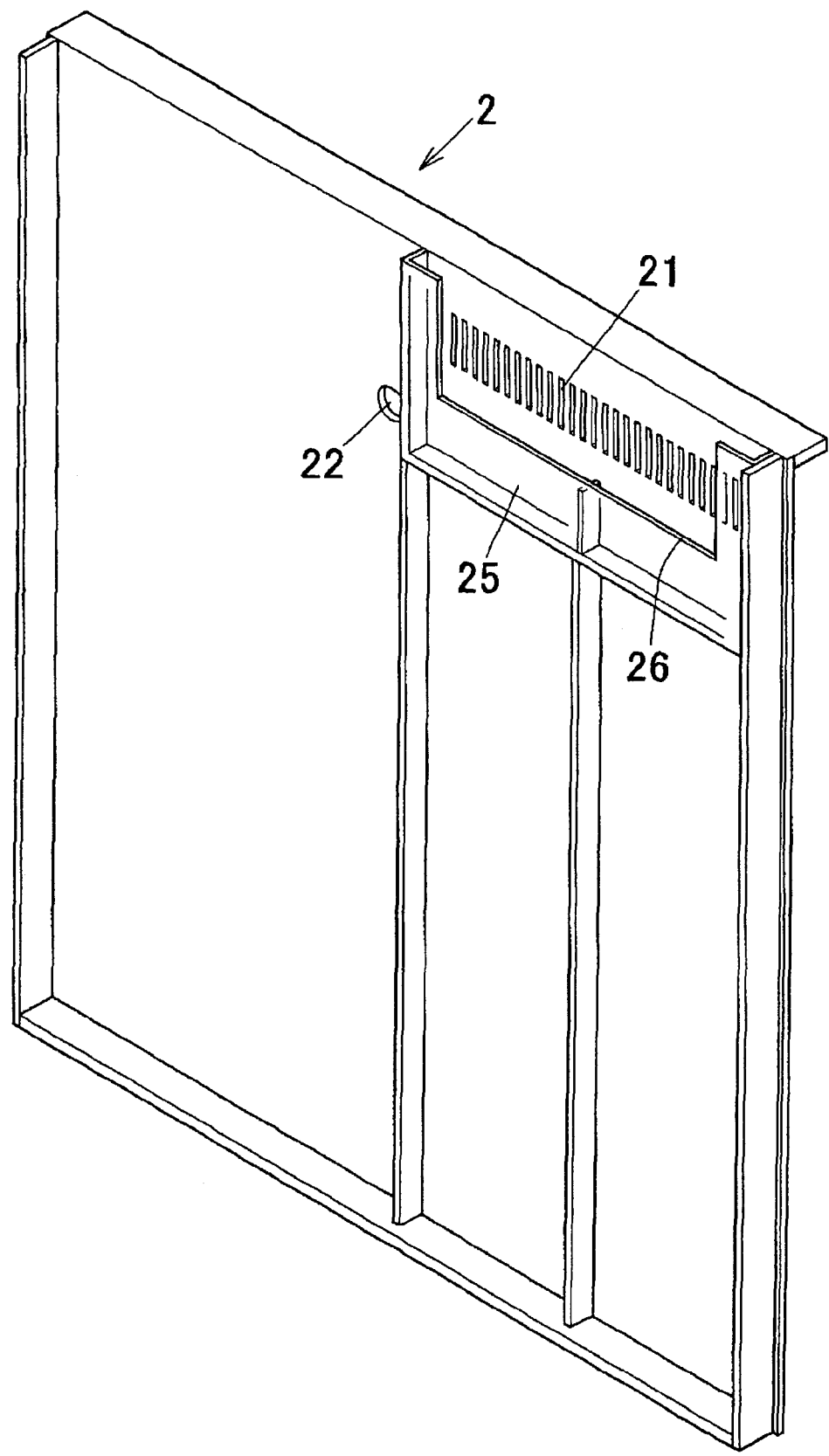
FIG. 14 is a rear side perspective view showing the partition wall of the embodiment.
Figure 15A:
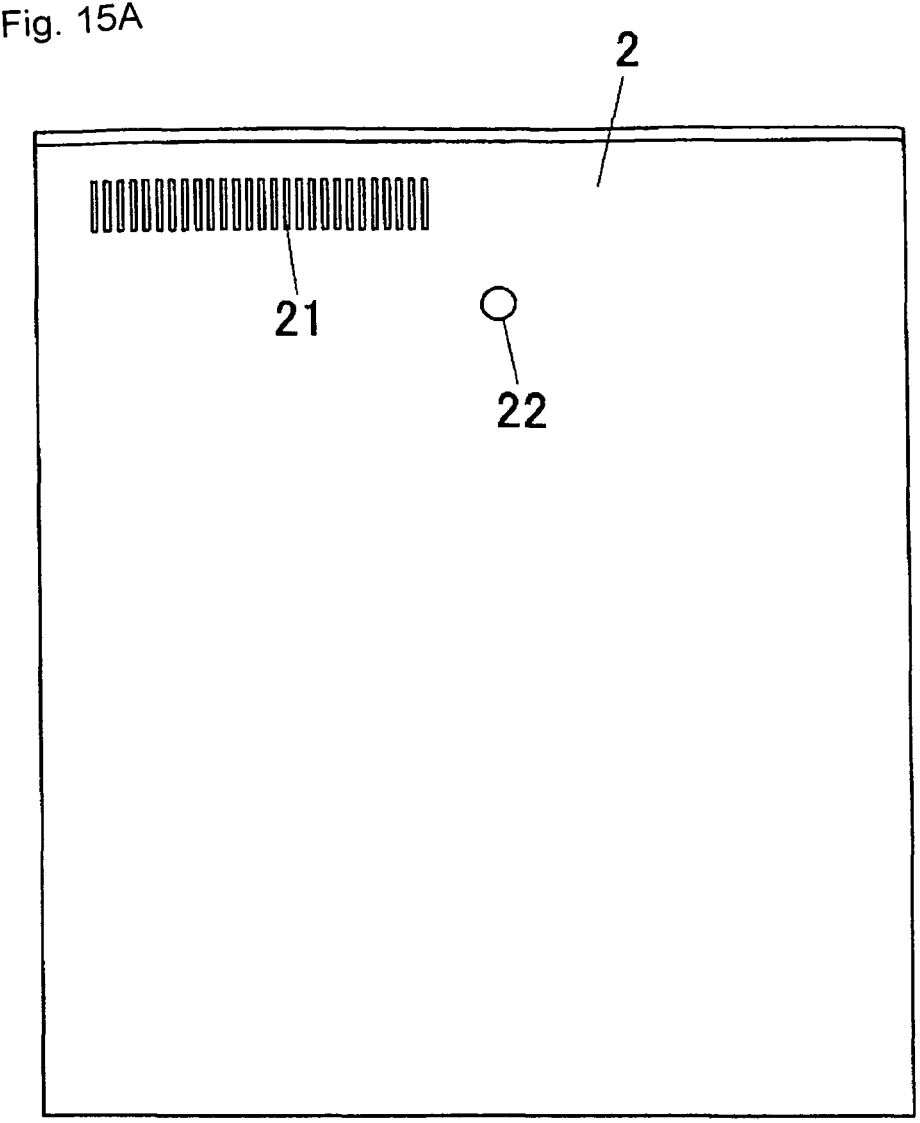
FIG. 15A is a front view of the partition wall of the embodiment.
Figure 15B:
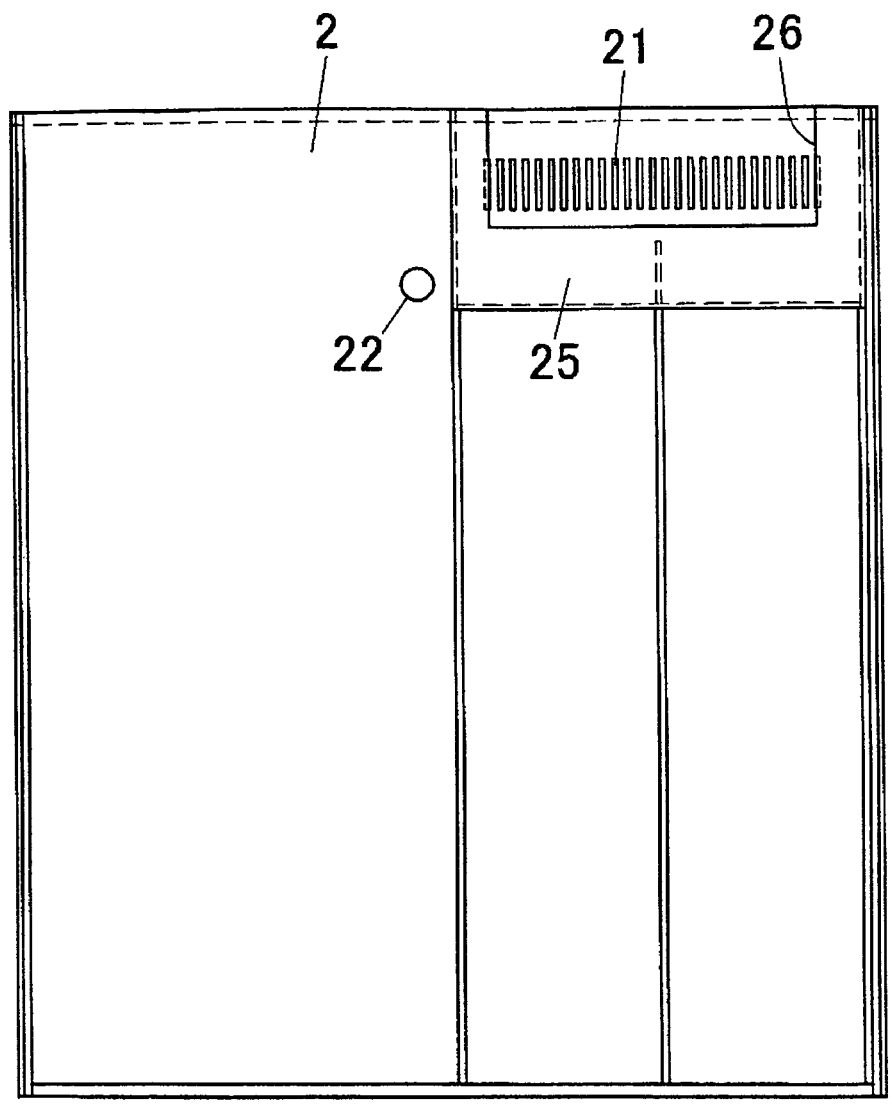
FIG. 15B is a rear side view of the partition wall of the embodiment.
Figure 15C:
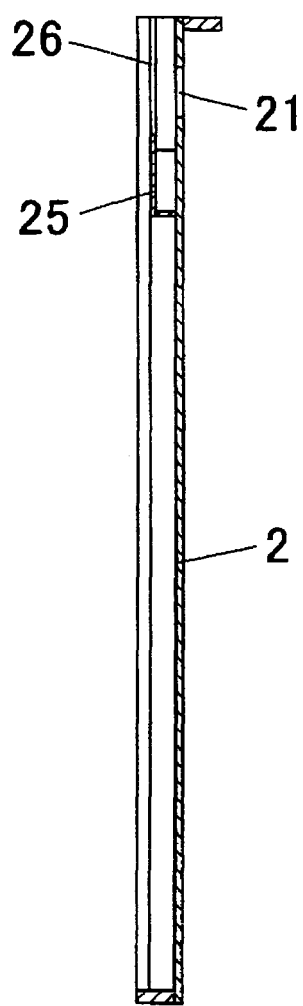
FIG. 15C is a side view of the partition wall of the embodiment.

As shown in FIGS. 13 to 15, an inlet opening 21 is formed at the side upper edge portion of the partition wall 2. The inlet opening 21 is constituted by a plurality of slits arranged in parallel in a horizontal direction and extended in the up-and-down direction. An outlet opening 22 is formed at the width-wise central upper edge portion of the partition wall 2.

An auxiliary plate 25 is provided behind the inlet opening 21 with a distance from the partition wall 2. The auxiliary plate 25 is provided with an inlet cut-out portion 26 formed by cutting out the region of the auxiliary plate 25 corresponding to the inlet opening 21. There is a space between the partition wall 2 and the auxiliary plate 25, and the water passed through the inlet opening 21 from the nurturing zone 12 by overflow will be temporarily retained in the space between the partition wall 2 and the auxiliary plate 25. Furthermore, the water retained in the space will be introduced into the filtration chamber 5 of the filtration unit 3 which will be explained later.

On the other hand, as shown in FIGS. 1 to 10, the filtration unit 3 is accommodated in the filtering zone 12 of the aquarium 1.

The filtration unit 3 is equipped with a box-shaped casing 4 sized to be accommodated in the filtering zone 12 in a fitted manner. The casing 4 is constituted by a transparent or semi-transparent plastic product, so that the internal structure can be visually observed from the outside. In this embodiment, the casing 4 constitutes a mounting frame.

Figure 5:
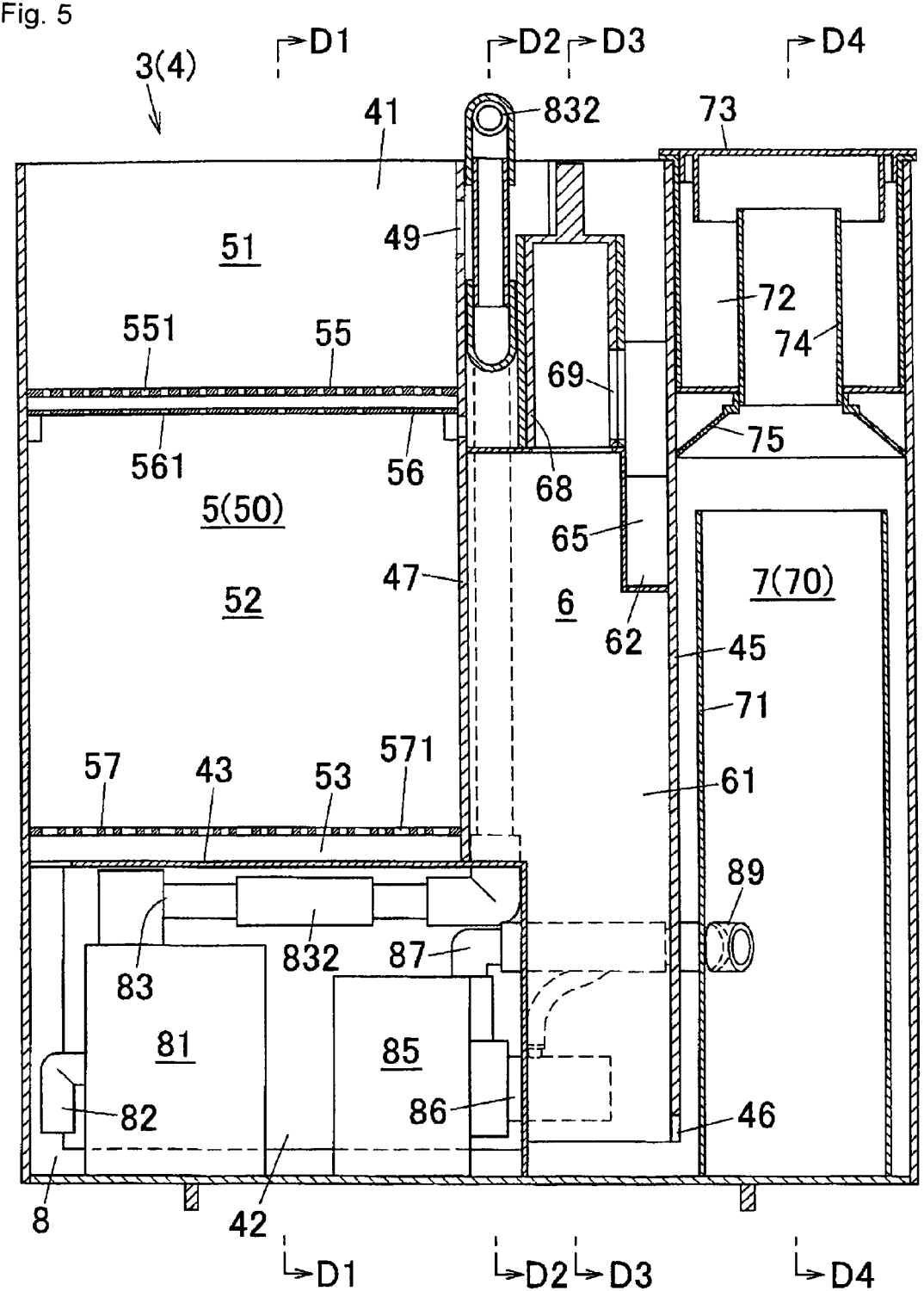
FIG. 5 is a front cross-sectional view of the front portion of the filtration unit of the embodiment.

Additionally, in this embodiment, the front side, the rear side, the left side, the right side, the upper side, and the left side of the filtration unit 3 as seen in FIG. 5 will be referred to as the front side, the rear side, the left side, the right side, the upper side, and the left side, respectively.

The upper side of the left half of the casing 4 is constituted as a filtration chamber 5 and the lower side of the left half of the casing 4 is constituted as a pump chamber 8. Furthermore, the left side of the right half of the filtration unit 3 is constituted as a water passage merging chamber 6, and the right side thereof is constituted as a skimmer chamber 7.

A partition wall 43 is horizontally formed between the filtration chamber 5 and the pump chamber 8 in the casing 4, and the two chambers 5 and 8 are divided by the partition wall 43. As will be explained later, a water communication opening 44 is formed on the left edge portion of the partition wall 43, and the two chambers 5 and 8 are communicated with each other via the water communication opening 44.

A partition wall 47 is perpendicularly formed between the filtration chamber 5 and the water passage merging chamber 6 of the casing 4, and the two chambers 4 and 5 are divided by the partition wall 47. As will explained later, a water communication opening 48 is formed at the lower end portion of the partition wall 47, and the two chambers 5 and 6 are communicated to each other via the water communication opening 48.

A partition wall 45 is perpendicularly formed between the water passage merging chamber 6 and the skimmer chamber 7 in the casing 4, and the two chambers 6 and 7 are divided by the partition wall 45. As will be explained later, a water communication opening 46 is formed at the lower end portion of the partition wall 45, and the two chambers 6 and 7 are communicated to each other via the water communication opening 46.

The upper end of the casing 4 is opened, and the upper end of each of the filtration chamber 5, the water passage merging chamber 6, and the skimmer chamber 7 are opened upwardly. The upper end opening portion 41 of the casing 4 is constituted as an opening portion for inserting and removing a unit member.

An opening portion 42 corresponding to the pump chamber 8 is formed on each of the front and rear walls of the casing 4, and the pump chamber 8 is opened frontward and rearward. The front and rear wall opening portions 42 are each constituted as an opening portion for removing and inserting the unit member.

Figure 3:
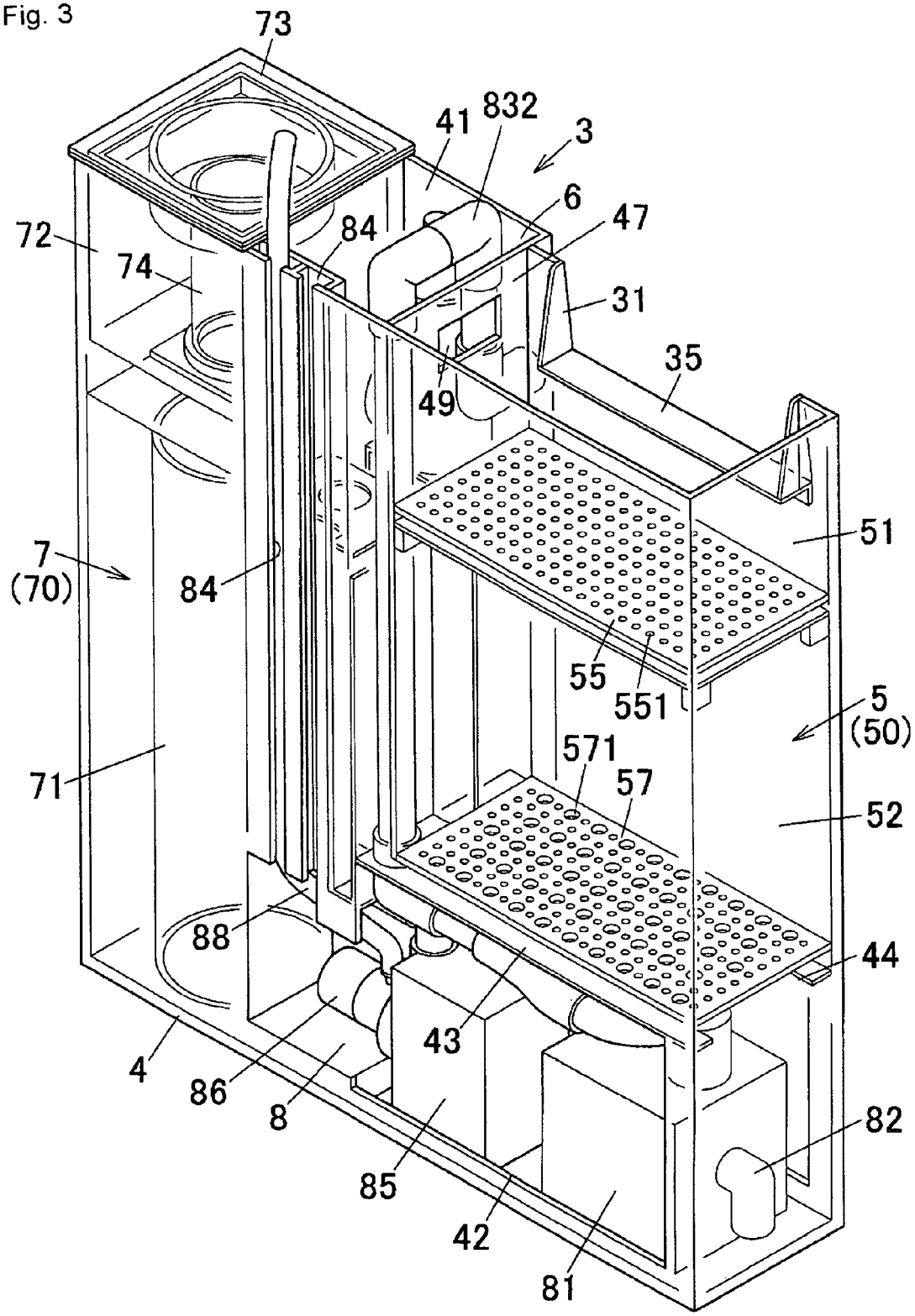
FIG. 3 is a perspective view showing the filtration unit of the aquarium system for aquatic organisms according to the embodiment.
Figure 7:
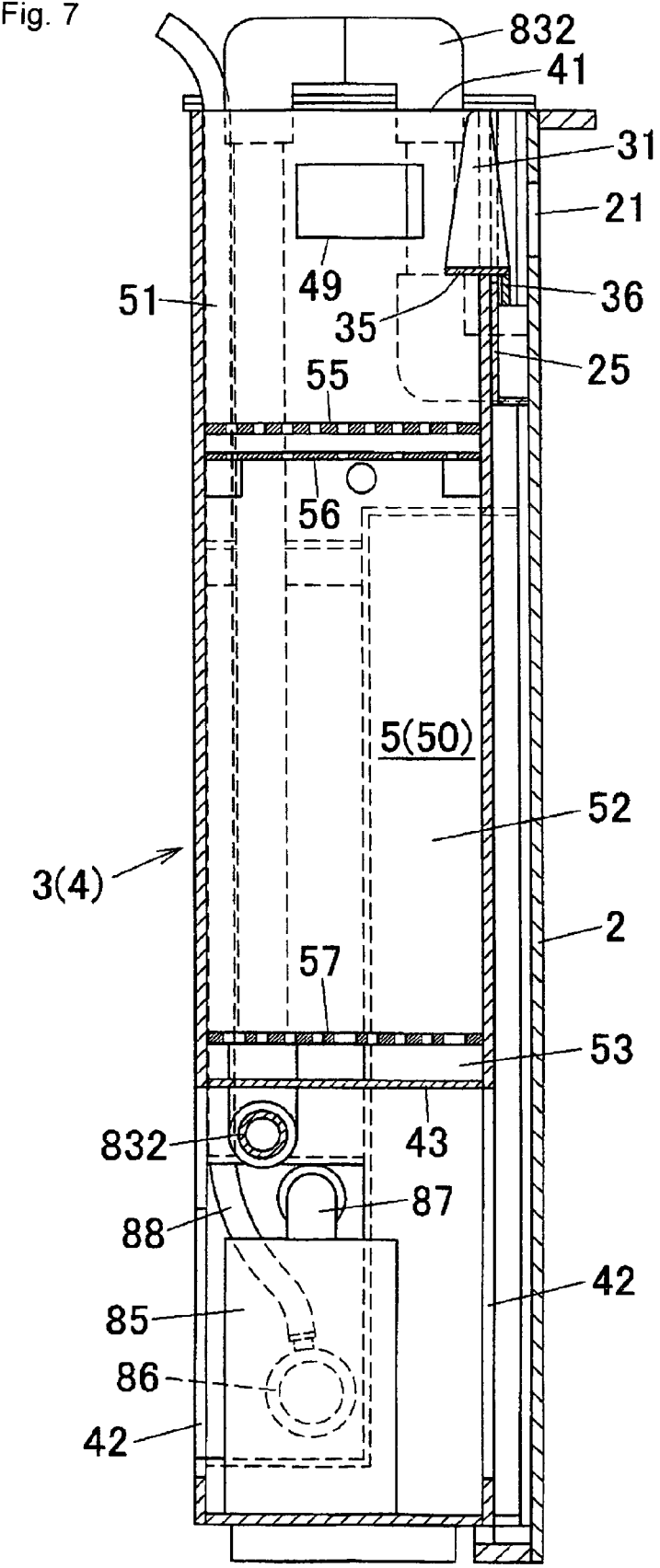
FIG. 7 is a side cross-sectional view of the filtration unit of the embodiment in which the filtration chamber portion is attached to the partition wall, which corresponds to the cross-sectional view taken along the line D1-D1 in FIG. 5.

An upper end portion of the front wall of the filtration chamber 5 of the casing 4 is cut-out to form an inlet cut-out portion 31. As shown in FIGS. 2, 3, and 7, at the lower edge portion of the inlet cut-out portion 31, a guide plate 35 is horizontally disposed so as to extend frontward from the inside of the filtration chamber 5, and an engaging ledge 36 extending downward is formed at the front end edge of the guide plate 35.

As shown in FIG. 7, when the casing 4 is accommodated in the filtering zone 12 of the aquarium 1, the engaging ledge 36 is engaged with the lower edge portion of the inlet cut-out portion 26 of the auxiliary plate 25 of the partition wall 2, whereby the guide plate 35 of the casing 4 is bridged between the inlet opening 21 of the partition wall 2 and the filtration chamber 5 of the casing 4. As a result, the water passing through the inlet opening 21 of the partition wall 2 from the nurturing zone 11 is smoothly led to the filtration chamber 5 by passing on the guide plate 35.

The filtration chamber 5 has an upper filtering material chamber 51 formed at an upper side of the filtration chamber 5, a lower filtering material chamber 52 formed at a lower side of the upper filtering material chamber 51, and an outlet chamber 53 formed between the lower filtering material chamber 52 and the pump chamber 8.

A pair of upper water scattering plates 55 and 56 are horizontally disposed with a space therebetween between the upper filtering material chamber 51 and the lower filtering material chamber 52. The pair of upper water scattering plates 55 and 56 are each disposed in the filtration chamber 5 in a detachable manner, and can be removably inserted via the upper end opening portion 41.

The pair of upper water scattering plates 55 and 56 are provided with a number of water scattering holes 551 and 561 in a dispersed manner. Therefore, the water introduced into the upper filtration material chamber 51 falls through the water scattering holes 551 and 561 and flows into the lower filtering material chamber 52.

A lower water scattering plate 57 is horizontally provided between the lower filtering material chamber 52 and the outlet chamber 53. The lower water scattering plate 57 is disposed in the filtration chamber 5 in a detachable manner, and can be removably inserted via the upper end opening portion 41 in a state in which the upper water scattering plates 55 and 56 are removed.

A number of water scattering holes 571 are formed in the lower water scattering plate 57 in a dispersed manner. Therefore, the water introduced into the lower filtration material chamber 52 falls through the water scattering holes 571 and flows into the outlet chamber 53.

The water flowed into the outlet chamber 53 is introduced into the pump chamber 8 via the water communication opening 44.

In this embodiment, a physical filtering materials (not illustrated), such as, e.g., wool and active carbon, are accommodated in the upper filtering material chamber 51 to capture impurities in water by making the water pass through the filtering material.

Furthermore, biological filtering materials (not illustrated), such as, e.g., ceramic rings and plastic bio balls, are accommodated in the lower filtering material chamber 52, so that pollutants in water can be dissolved with filtering bacteria attached to these filtering materials.

In this embodiment, a filtration device 50 is constituted by the upper and lower filtering material chambers 51 and 52, the outlet chamber 53, the water scattering plates 55 to 57, etc.

At the upper end of the front wall of the water passage merging chamber 6 of the casing 4, an outlet opening 32 is formed corresponding to the inlet opening 22 of the partition wall 2 (see FIG. 2). The outlet opening 32 faces the outlet opening 22 of the partition wall 2 when the filtration unit 3 is accommodated in the filtering zone 12.

On the other hand, a circulation pump 81 and a skimmer pump 85 are disposed in the pump chamber 8.

As will be explained below, the circulation pump 81 circulates water between the nurturing zone 11 and the filtering zone 12.

In detail, a suction pipe 82 of the circulation pump 81 is disposed so as to oppose to the bottom surface of the pump chamber 8 so that the water in the pump chamber 8 is suctioned from the suction pipe 82 of the circulation pump 81.

Figure 6:
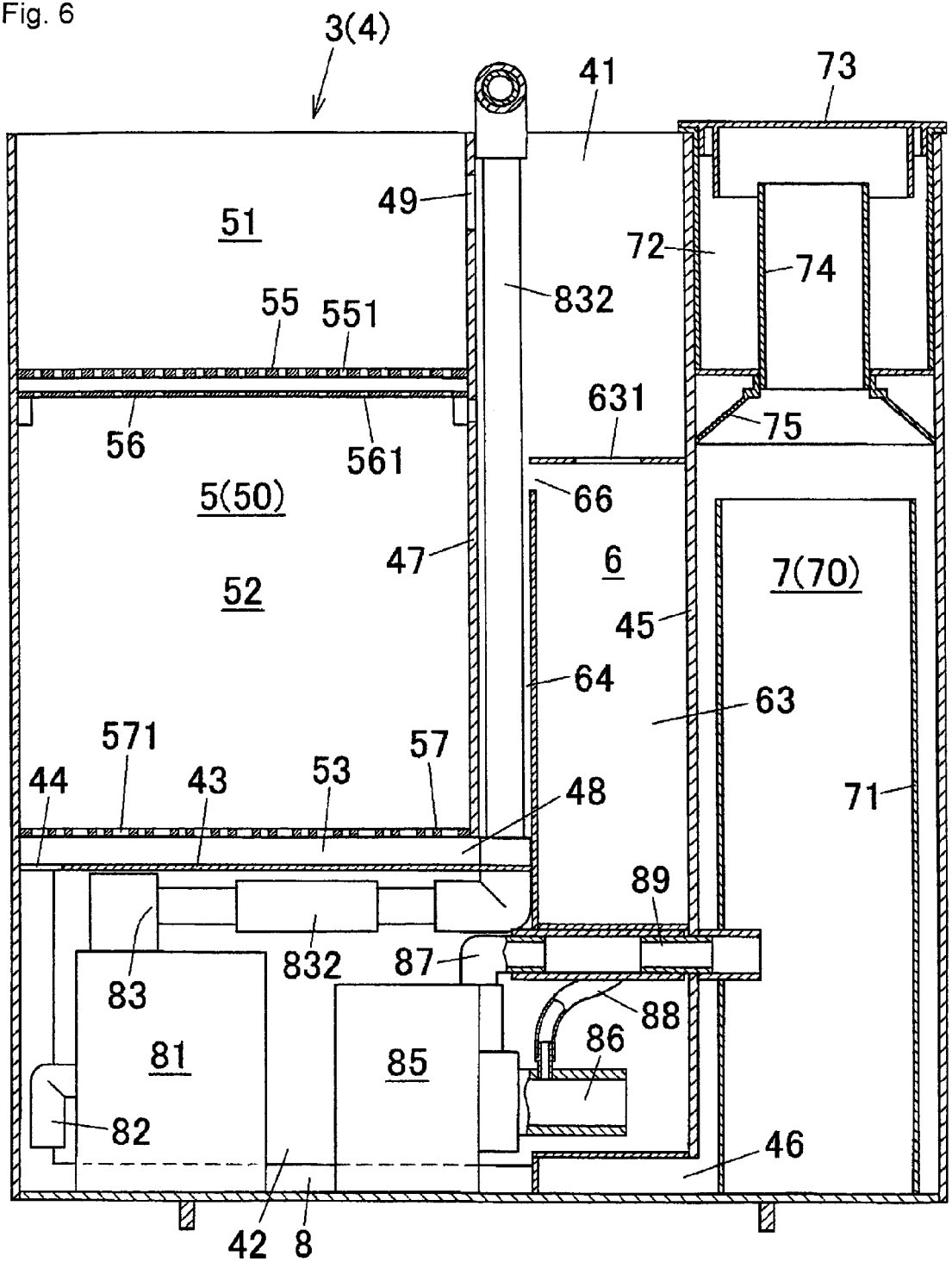
FIG. 6 is a front cross-sectional view of the rear portion of the filtration unit of the embodiment.
Figure 8:
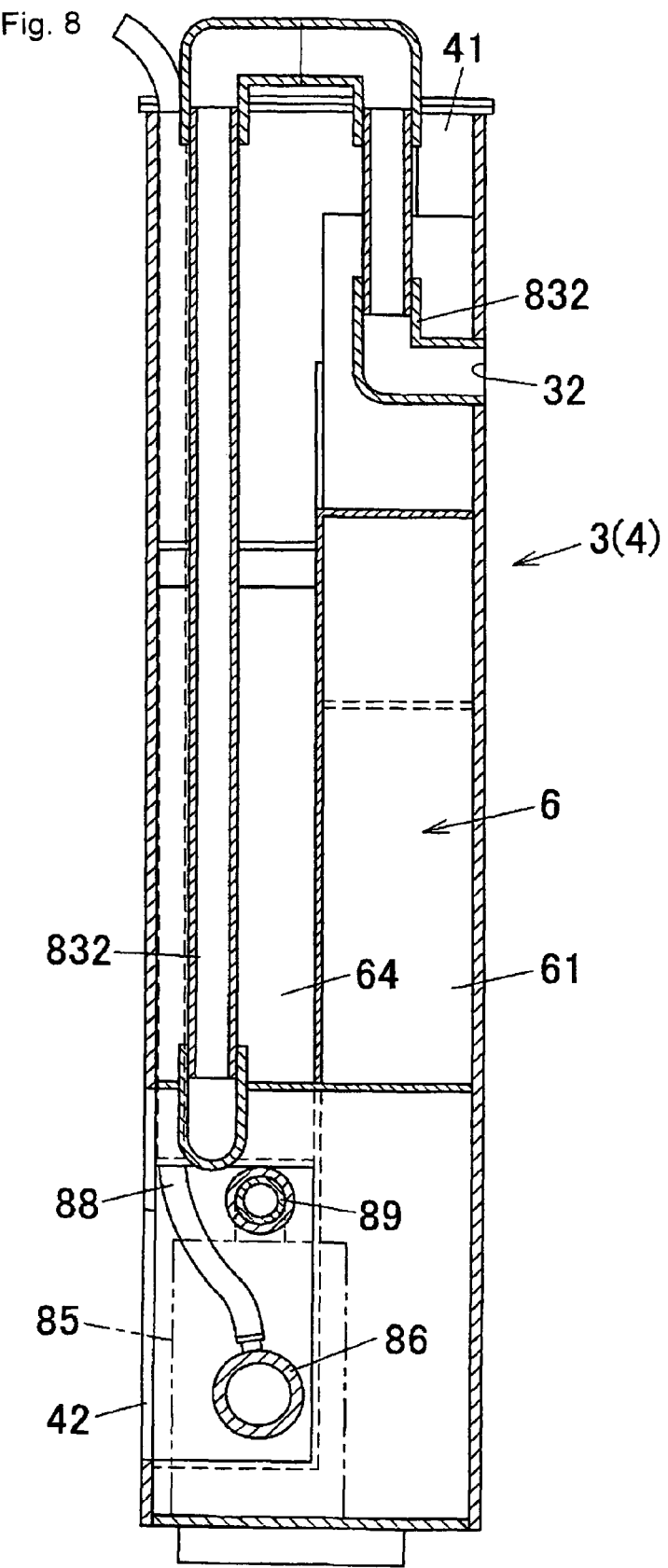
FIG. 8 is a side cross-sectional view of the left side portion of the water passage merging chamber in the filtration unit of the embodiment, which corresponds to the cross-sectional view taken along the line D2-D2 in FIG. 5

As shown in FIGS. 6 to 8, a discharge tube 832 is connected to the discharge port 83 of the circulation pump 81 in fluid communication. The discharge tube 832 is led into the water passage merging chamber 6 from the pump chamber 8 and connected to the outlet opening 32 of the casing 4 in fluid communication. Therefore, the water discharged from the discharge port 83 of the circulation pump 81 is discharged from the outlet opening 32 via the discharge tube 832. Also, in a state in which the casing 4 is accommodated in the filtering zone 12, the water discharged from the outlet opening 32 of the casing 4 is returned to the inside of the nurturing zone 11 via the discharge opening 22 of the partition wall 2. Furthermore, as water is fed to the nurturing zone 11 from the filtering zone 12, the water is flowed into the filtration chamber 5 via the inlet opening 21 of the partition wall 2 from the nurturing zone 11.

In this way, water is circulated between the nurturing zone 11 and the filtering zone 12 by the circulation pump 81.

Also, the skimmer pump 85, as will be explained below, supplies air bubble mixed water to the protein skimmer 70.

In other words, the suction port 86 of the skimmer pump 85 is disposed adjacent to the bottom surface of the pump chamber 8. One end of an air supplying tube 88 is connected to the suction port 86 of the skimmer pump 85 and the other end of the air supplying tube 88 is disposed above the casing 4 (above the water surface).

When the skimmer pump 85 is activated, the water retained in the pump chamber 8 is suctioned into the suction port 86 of the skimmer pump 85 and, at the same time, fresh air is suctioned via the air supplying tube 88. In this way, the water and air suctioned into the suction port 86 are mixed, and the air bubble mixed water is discharged from the discharge port 87.

A discharge tube 89 is in fluid communication with the discharge port 87 of the skimmer pump 85. This discharge tube 89 penetrates through the water passage merging chamber 6 and is led to the skimmer chamber 7, and is in fluid communication with the skimmer cylinder 71 which will be explained later. Therefore, the air bubble mixed water discharged from the discharge port 87 of the skimmer pump 85 is led into the skimmer cylinder 71 through the discharge tube 89.

Figure 9:
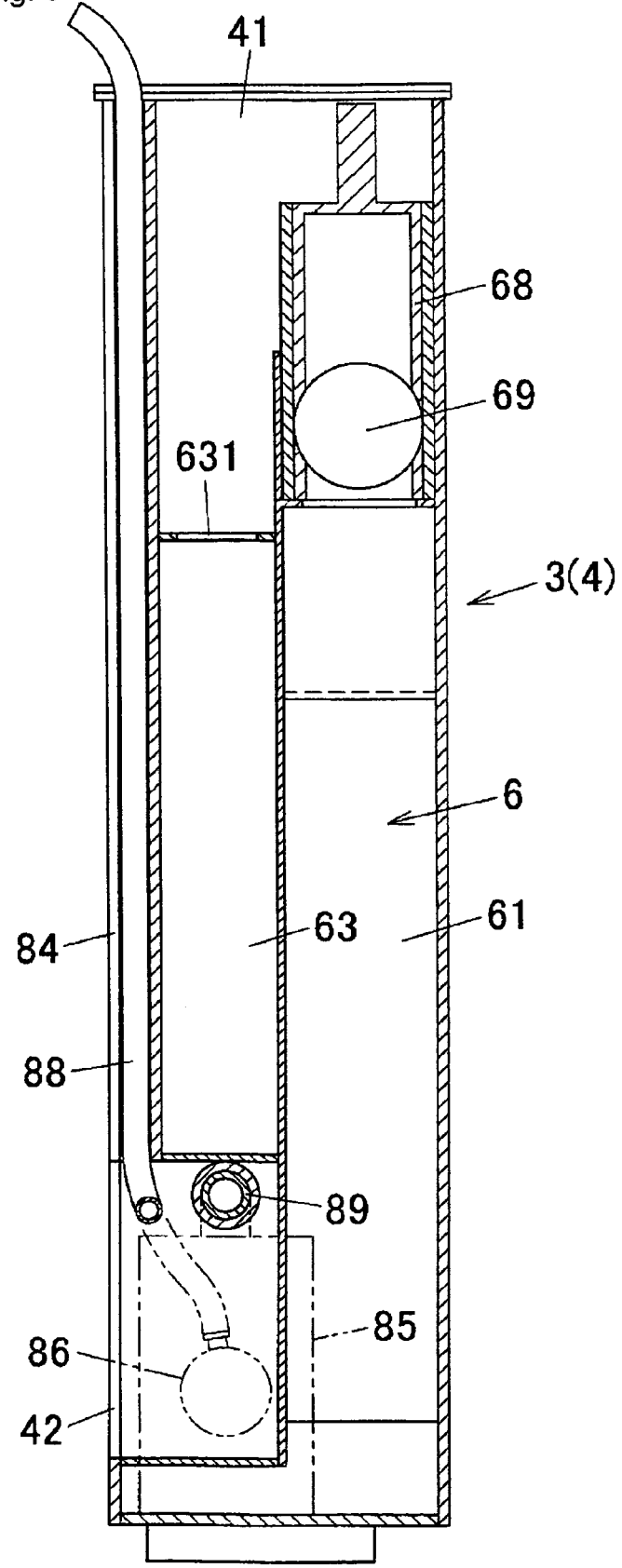
FIG. 9 is a side cross-sectional view of the right side portion of the water passage merging chamber in the filtration unit of the embodiment, which corresponds to the cross-sectional view taken along the line D3-D3 in FIG. 5.

As shown in FIGS. 3 and 9, in this embodiment, wiring/tubing accommodation grooves 84 and 84 extending in the up-and-down direction corresponding to the water passage merging chamber 6 are formed on the rear wall of the casing 4. In the wiring/tubing accommodation grooves 84 and 84, the lower end thereof is open to the rear wall opening portion 42 of the casing 4, and the upper end thereof is open to the upper end of the casing 4. Therefore, for example, by accommodating the air supplying tube 88 connected to the skimmer pump 85 in the wiring/tubing accommodation groove 84, the air supplying tube 88 can be smoothly pulled out to the outside of the filtration unit 3, or the outside of the aquarium 1, from the pump chamber 8 while preventing occurrence of inconvenience that the air supplying tube 88 gets tangled up with other components.

Also, in this embodiment, by accommodating the power cords (not illustrated) of the circulation pump 81 and the skimmer pump 85 in the wiring/tubing accommodation grooves 84, the power cords can be smoothly pulled out to the outside of the aquarium 1 while preventing occurrence of inconvenience that the power cords get tangled up with other components.

Figure 10:
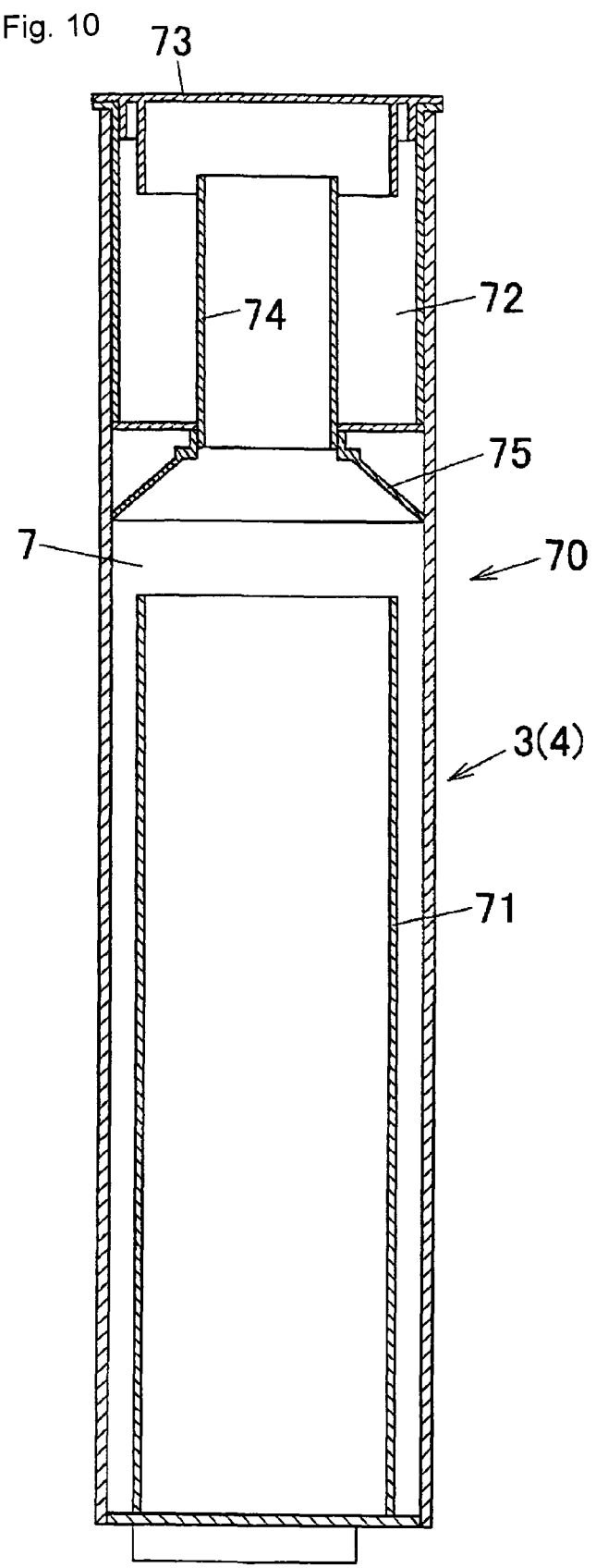
FIG. 10 is side cross-sectional view showing the skimmer chamber portion in the filtration unit of the embodiment, which corresponds to the cross-sectional view taken along the line D4-D4 in FIG. 5.

As shown in FIGS. 5, 6, and 10, a cylindrical skimmer cylinder 71 is vertically disposed in the skimmer chamber 7. The bottom end of the skimmer cylinder 71 is closed by the lower wall of the skimmer chamber 7 and the top end is open in the skimmer chamber 7.

Figure 4:
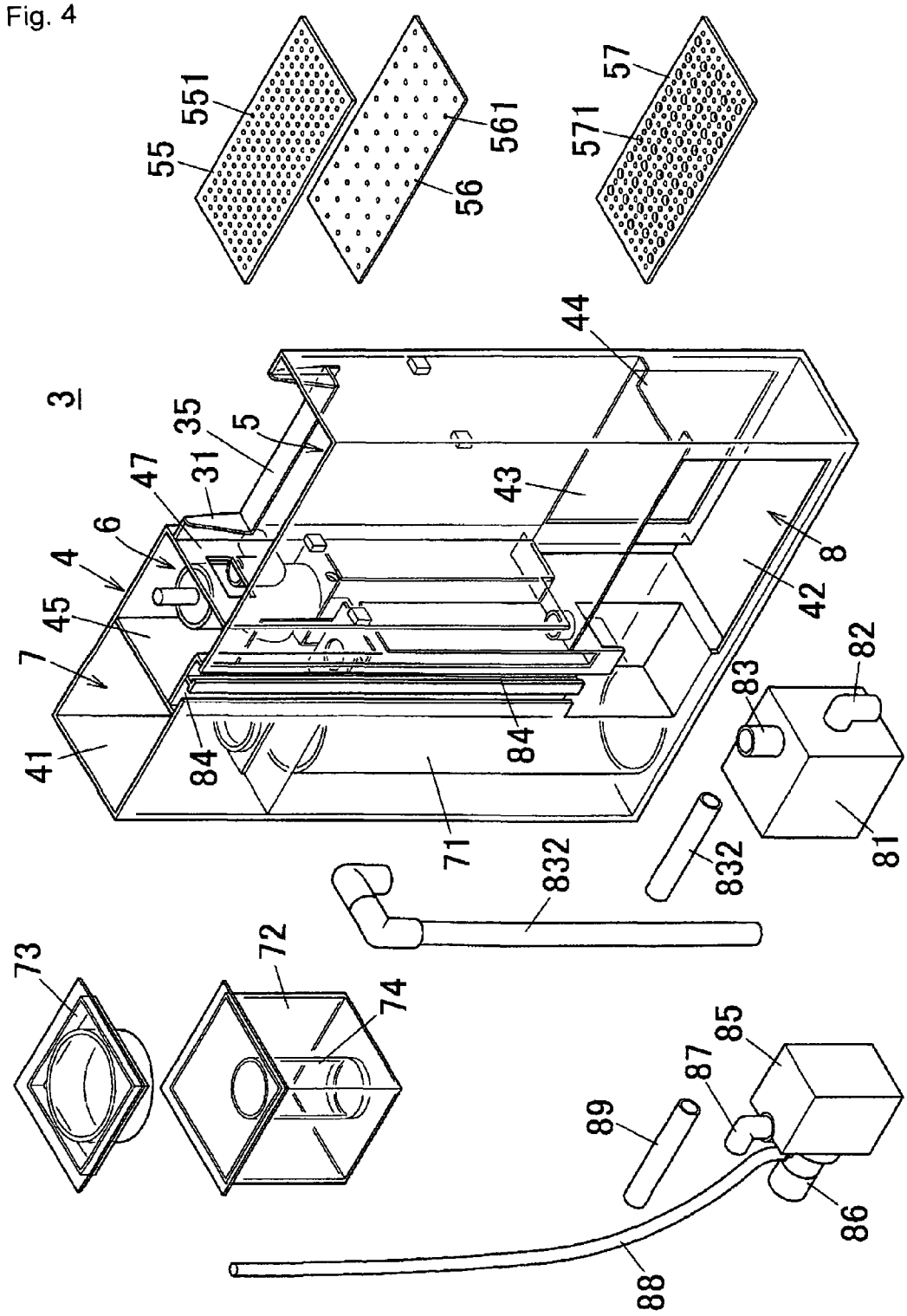
FIG. 4 is a perspective view showing the filtration unit in a disassembled state.

A protein collection box 72 is removably fitted in the portion of the upper end opening 41 of the casing 4 which corresponds to the skimmer chamber 7 (see, e.g., FIG. 4). The upper end of the protein collection box 72 is open and a lid member 73 is detachably attached to the upper end opening.

Furthermore, a protein lead-in pipe 74 is attached to the bottom wall of the protein collection box 72 in a penetrating manner. The top end opening of the pipe 74 is open to the inside of the protein collection box 72 and the bottom end opening is disposed so as to face the upper end opening of the skimmer cylinder 71. Furthermore, a guide member 75 widened toward the end is formed at the lower end of the protein lead-in pipe 74, so that, as explained later, a number of air bubbles discharged from the skimmer cylinder 71 are efficiently led into the pipe 74 via the guide member 75.

In this embodiment, the protein skimmer 70 is constituted by the skimmer cylinder 71, the protein collection box 72, the lid member 73, the protein lead-in pipe 74 and the guide member 75. In a broad sense, it should be noted that, in addition to these components, the protein skimmer 70 can be constituted by the skimmer pump 85, the skimmer chamber 7, etc.

As mentioned earlier, in the protein skimmer 70, air bubble mixed water is introduced into the skimmer cylinder 71 via the discharge tube 89 from the skimmer pump 85.

The water discharge direction at the outflow side end portion of the discharge tube 89 is set to be approximately tangential to the inner circumferential surface of the skimmer cylinder 71. Therefore, the air bubble mixed water let into the skimmer cylinder 71 from the discharge tube 89 gradually rises up while circulating along the inner circumferential surface of the skimmer cylinder 71. A longer contact time of the air bubbles and the water can be secured by the air bubble mixed water gradually rising in a spiral shape, causing efficient adherence of foreign matters such as proteins in the water to air bubbles, which enables assured removal of proteins and the like from the water.

The protein removed water overflows from the upper end position of the skimmer cylinder 71 and flows down in the skimmer chamber 7.

The protein adhered air bubbles go up with the buoyant force while being pushed up by continuously rising air bubbles coming from below to be flowed out of the upper end of the skimmer cylinder 71, and then further go up to be introduced into the protein lead-in pipe 74 via the guide member 75. The air bubbles with proteins introduced into the pipe 74 go up in the pipe 74 and overflow from the upper end of the pipe 74 to be collected in the protein collection chamber box 72.

Needless to say, when discarding the proteins collected in the protein collection box 72, the protein collection box 72 is taken out from the skimmer chamber 7 and the lid member 73 is removed, and then the proteins collected in the protein collection box 72 are discarded.

On the other hand, as will be explained later, the protein removed water overflowed from the upper end of the skimmer cylinder 71 will be returned to the pump chamber 8 and then returned therefrom to the nurturing zone 11 by the circulation pump 81.

Figure 11:
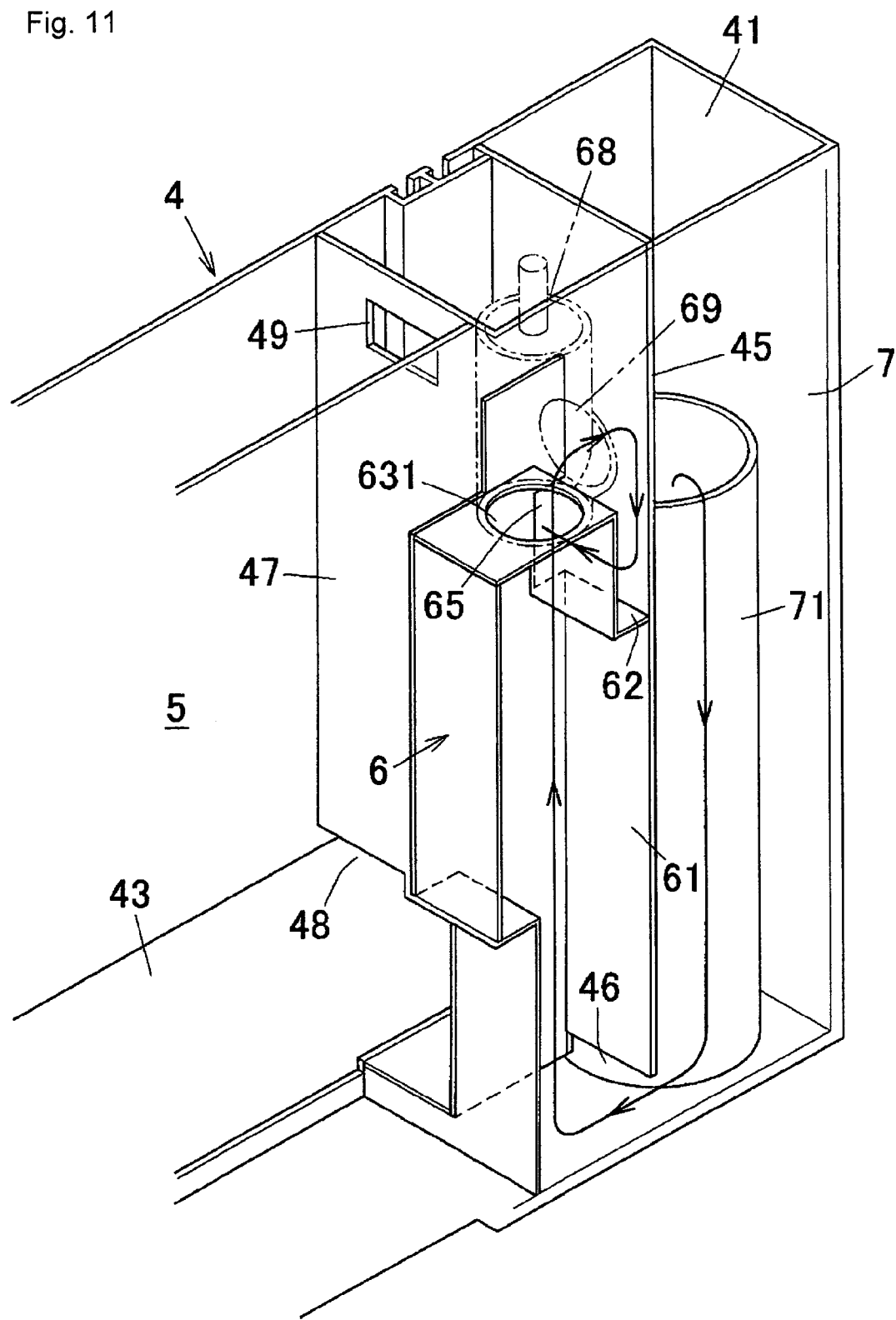
FIG. 11 is a perspective view showing the front half of the discharge passage after elimination of proteins in the filtration unit of the embodiment.

As shown in FIGS. 5, 9, and 11, a water passage opening 46 is provided at the lower end front portion of the partition wall 45 arranged between the water passage merging chamber 6 and the skimmer chamber 7, so that water flows into the lower end of the first water passage 61 of the water passage merging chamber 6, which will be explained later, through the lower end of the skimmer chamber 7. For an easy understanding of the invention, in FIG. 11, the water flow is depicted by a continuous arrow (also shown in FIG. 12).

The water passage merging chamber 6 is divided into a plurality of water passages 61 to 64 by a plurality of partitioning members.

At the front portion of the water passage merging chamber 6, a first water passage 61 is provided along the vertical direction. The lower end portion of this first water passage 61 is, as mentioned above, communicated with the lower end of the skimmer chamber 7 via the water passage opening 46. The water introduced into the lower end of the first water passage 61 via the water passage opening 46 from the lower end of the skimmer chamber 7 goes up along the first water passage 61.

A water level adjustment pipe 68 is provided at the upper end portion of the first water passage 61. The water level adjustment pipe 68 has a dual pipe structure in which an inner pipe is accommodated in an outer pipe in a rotatable manner, and openings formed in each peripheral walls of the inner and outer pipes constitute an outlet opening 69. By rotating the inner pipe with respect to the outer pipe to change the opening area and the opening position of the outlet opening 69, the flow amount and water pressure of the water flowing out from the outlet opening of the water level adjustment pipe 68 are adjusted to thereby adjust the water pressure in the first water passage 61. With this adjustment, the water level of the skimmer chamber 7 can be adjusted.

The water level adjusting pipe 68 is not always required to be formed by the dual pipe structure, and can be any structure so long that it is a water level adjustable structure. For example, a shutter member can be provided at the outlet opening formed in the peripheral wall of a single pipe in an openable and closable manner, and the shutter member is opened/closed to change, e.g., the opening area of the outlet opening to adjust the flow amount and water pressure of the water flowing out of the outlet opening to thereby adjust the water level of the skimmer chamber 7.

The water passage merging chamber 6 has at its right upper portion a second water passage 62. The front portion of the second water passage 62 is arranged corresponding to the outlet opening 69 of the water level adjustment pipe 68 so that the water flowed out of the outlet opening 69 of the water level adjustment pipe 68 flows into the front portion of the second water passage 62. Further, the water flowed into the front portion of the second water passage 62 is moved rearward along the second water passage 62.

Figure 12:
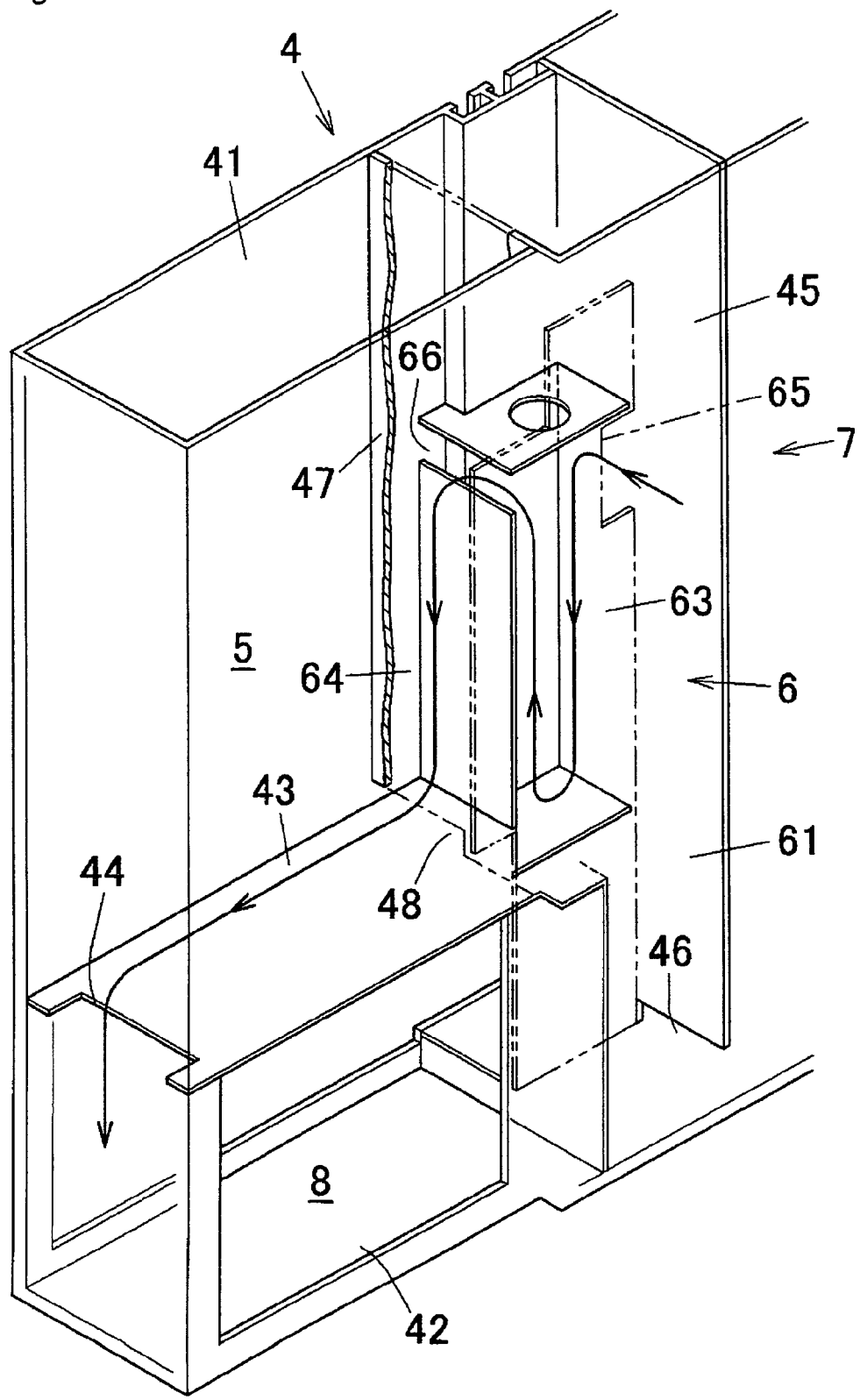
FIG. 12 is a perspective view showing the rear half of the discharge passage after elimination of proteins in the filtration unit of the embodiment.

As shown in FIGS. 6, 9, and 12, the water passage merging chamber 6 has at its right rear side a vertically extending third water passage 63. The upper right side of this third water passage 63 is in communication with the rear end of the second water passage 62 via an water passage opening 65, so that the water flowed out from the rear end of the second water passage 62 is flowed into the third water passage 63 via the water passage opening 65.

The upper wall of the third water passage 63 has a heater insertion hole 631, and this heater insertion hole 631 is open upward via the upper end opening portion 41 of the casing 4. Therefore, a user can mount a heater in the third water passage 63 via the heater insertion hole 631 if needed.

The water passage merging chamber 6 has at its rear left side a fourth water passage 64 extending in a vertical direction. The upper end of this fourth water passage 64 is in fluid communication with the upper left side of the third water passage 63 via a water passage opening 66. Therefore, the water flowed into the third water passage 63 flows into the fourth water passage 64 via the water passage opening 66 and then flows down along the fourth water passage 64.

The third-water passage 63 is formed to have a larger capacity than the other water passages and has the water passage openings 65 and 66 at the upper end portion. With this structure, the water flowed into the third water passage 63 flows out while slowly circulating. Thus, in cases where a heater is mounted in the third water passage 63 as mentioned above, the water in the third water passage 63 can be sufficiently heated with the heater.

A water passage opening 48 is formed at the lower end of the partition wall 47 provided between the fourth water passage 64 of the water passage merging chamber 6 and the outlet chamber 53 of the filtration chamber 5, and the forth water passage 64 is in fluid communication with the right end portion of the outlet chamber 53 of the filtration chamber 5 via the water passage opening 48.

The water flowed into the outlet chamber 53 will be introduced into the pump chamber 8 as explained above, and fed to the nurturing zone 11 with the circulation pump 81.

As shown in FIGS. 2 to 4, the upper end of the partition wall 47 arranged between the filtration chamber 5 and the water passage merging chamber 6 is provided with an opening 49. This opening 49 is configured such that, when the water level in the upper filtering material chamber 51 excessively increases, the water in the upper filtering material chamber 51 overflows to be directly introduced into the pump chamber 8 to be returned to the nurturing zone 11.

This opening 49 can be detachably engaged by a handle (not illustrated). Therefore, when taking out the filtration unit 3 from the filtering zone 12, the handle is engaged with the opening 49 and the entire filtration unit 3 is raised with the handle.

As explained above, the filtration unit 3 is constituted by putting together filtration related components, i.e., the filtration device 50, various water passages, various tubes, the protein skimmer 70, the pumps 81 and 85, etc., in the casing 4. The filtration unit 3 is removably accommodated in the filtering zone 11 of the aquarium 1 to constitute the aquarium system for aquatic organisms of this embodiment.

In addition, in a state in which the filtration unit 3 is accommodated in the filtering zone 12, the outlet side end portion of the discharge tube 832 is disposed at a position corresponding to the position of the outlet opening 22 of the partition wall 2. As shown in FIG. 1, a discharge nozzle 221 is fitted to the outlet side end portion of the discharge tube 832 via the outlet opening 22 of the partition wall 2.

Furthermore, in a state in which the filtration unit 3 is accommodated in the filtering zone 12, it is configured such that the filtration unit 3 is fit in the filtering zone in such a way that no excessive space is formed around the outer circumference of the filtration unit 3 in the filtering zone 12.

In this embodiment, no lid member is typically provided on the upper end of the aquarium 1, and the upper sides of the nurturing zone 11 and the filtering zone 12 are open. Therefore, in this aquatic organism aquarium system of this embodiment, a hanging type lighting device can be used without inconvenience. In the present invention, alternatively, an openable and closable lid member can be provided on the upper end of the aquarium.

In the aquarium system for aquatic organisms having the abovementioned structure, when the circulation pump 81 and the skimmer pump 85 are activated in a state in which the filtration unit 3 is accommodated in the filtering zone 12 of the aquarium 1 filled with water (seawater), the water in the pump chamber 8 is supplied to the nurturing zone 11 via the discharge tube 832 by the circulation pump 81.

On the other hand, the water in the nurturing zone 11 flows over the inlet cut-out portion 31 of the filtration unit 3 through the inlet opening 21 of the partition wall 2 and flows into the upper filtering material chamber 51. The water flowed into the upper filtering material chamber 51 is physically filtered by passing through the physical filtering material (not illustrated) disposed inside the upper filtering material chamber 51 and thereafter, dripped from the water scattering holes 551 and 561 of the upper water scattering plates 55 and 56 and flowed into the lower filtering material chamber 52. The water flowed into the lower filtering material chamber 52 passes through the biological filtering material (not illustrated) disposed inside the lower filtering material chamber 52 to be biologically filtered, and then the water is dripped from the lower water scattering plate 57 and flowed into the outlet chamber 53. The water flowed into the outlet chamber 53 is flowed into the pump chamber 8 via the water communication opening 44.

In this embodiment, an interconnected cell soft foam such as a sponge can be arranged at a position corresponding to the water communication opening 44 of the pump chamber 8. In this case, the water flowing down from the water communication opening 44 passes through the sponge to be gently led into the pump chamber 8, which prevents the occurrence of water dropping sound. Furthermore, by letting the water pass through the sponge, physical filtering can be conducted, which results in a further improved filtering function.

The water flowed into the pump chamber 8 is suctioned into the circulation pump 81 and returned to the nurturing zone 11 via the discharge tube 832.

A portion of the water flowed into the pump chamber 8 is suctioned into the skimmer pump 85 and mixed with air bubbles, and then supplied to the skimmer cylinder 71 via the discharge tube 89.

As explained above, the water mixed with air bubbles introduced into the skimmer cylinder 71 goes up while circulating, and meanwhile, foreign matters, such as, e.g., proteins, contained in the water adhere to the air bubbles. Thus, proteins can be removed from the water. The protein removed water overflows from the skimmer cylinder 71 and flows into the skimmer chamber 7. Also, a number of protein adhered air bubbles go up and is collected in the protein collection box 72 via the protein lead-in pipe 74.

As explained above, the water that flowed into the skimmer chamber 7 is flowed into the outlet chamber 53 of the filtration chamber 5 via each water passage 61 to 64 of the water passage merging chamber 6. Furthermore, the water flowed into the outlet chamber 53 is similarly flowed into the pump chamber 8 and returned to the nurturing zone 12.

As described above, according to the aquarium system for aquatic organisms of this embodiment, a filtration unit 3 is constituted by putting together filtration related components, such as the filtration device 50, various water passages, various tubes, the protein skimmer 70, the pumps 81 and 85, and the filtration unit 3 is accommodated in the filtering zone 12 of the aquarium 1. As a result, the dead space in the casing 4 can be reduced, and the filtration unit 3 and the filtering zone 12 can be downsized, which in turn can downsize the entire aquarium system.

The filtration unit 3 is constituted such that it can be removed from the filtering zone 12 of the aquarium 1. Therefore, when performing maintenance of a unit component (functional component) such as the circulation pump 81, a predetermined component, e.g., the circulation pump 81, can be removed from the filtration unit 3 after removing the filtration unit 3 from the aquarium 1 to efficiently and assuredly perform the maintenance of the predetermined component.

Especially in this embodiment, all components to be accommodated in the filtering zone 12 are collectively assembled to constitute the filtration unit 3. Therefore, even when performing maintenance for any of the components, it can be done assuredly only by removing the filtration unit 3, which enables more efficient and accurate maintenance work.

After the maintenance, the filtration unit 3 can be accommodated into the filtering zone 12 after assembling the components such as the circulation pump 81 into the filtration unit 3.

The filtration unit 3 of this embodiment includes two types of filtration devices (purification devices), i.e., the permeation type filtration device 50 which filters water by making the water pass through filtering materials, and the protein skimmer 70 which eliminates proteins contained in the water by making the proteins adhere to air bubbles, which results in a further enhanced filtering function. The protein skimmer 70, especially, can continuously remove foreign matters, such as proteins, to the outside without retaining them inside the circulation path of the water, so the filtering function can be remarkably improved. Therefore, a comfortable nurturing environment filled with clean saltwater can be provided for invertebrates including coral reef and jelly fish that strictly require a certain level of water quality, as well as marine organisms, enabling easy keeping of these marine organisms for a long period of time without causing problems.

Furthermore, in this embodiment, the filtering materials are accommodated in the filtering material chambers 51 and 52 of the casing 4 to constitute the filtration unit 3. This assuredly can prevent occurrence of problems such as pollution of the aquarium when replacing the filtering materials with new ones.

In other words, in the case in which filtering materials are directly accommodated in the filtering zone like a conventional aquarium system, when the filtering materials are removed when replacing them with new ones, paste-like foreign materials and various germs collected by the filtering materials may drop into the aquarium, polluting the water in the aquarium, which may extensively and adversely affect the aquatic organisms.

On the other hand, in this embodiment, the filtering materials are accommodated in the casing 4 to constitute the filtration unit 3, and therefore even if the filtration unit 3 is removed from the aquarium 1 at the time of replacing the filtering materials, the foreign matters and various germs dropping from the filtering materials can be caught inside the casing 4. As a result, the foreign matters and various germs can be assuredly prevented from entering into an outside of the casing 4, or an inside of the aquarium 1. Therefore, problems that the aquarium is polluted when exchanging filtering materials can be assuredly prevented.

In addition, in this embodiment, it is configured such that the water passed through the protein skimmer 70 passes through a complex and long discharge path formed by a plurality of water passages 61 to 64, etc., to be returned to the nurturing zone 11. Therefore, even if air bubbles (proteins) are mixed into the water after passed through the protein skimmer, the air bubbles float up because of the buoyancy and are released from the water surface. Therefore, the water mixed with air bubbles (including impurities such as proteins) is assuredly prevented from flowing into the nurturing zone, and the pollution of water can be more assuredly prevented.

In addition, in this embodiment, the permeation type filtration device 50 and the protein skimmer 70 are used as a purification device, but in the present invention, an ultraviolet irradiation device that eliminates bacteria such as various germs in water by irradiating ultraviolet light to the water for sterilization can be used. In the present invention, however, one or more purification devices among the permeation type filtration device, the protein skimmer, and the ultraviolet irradiation device can be employed.

Furthermore, in the present invention, it is not always required that all components to be disposed in the filtering zone (purification zone) are formed into a unit component. For example, in the case of arranging a plurality of purification devices in the filtering zone, it can be configured such that only one of purification devices among purification devices to be disposed in the filtering zone is included in the filtering unit (purifying unit). For example, it also can be configured such that the protein skimmer is included in the filtration unit and the permeation type filtration device is disposed in the filtering zone separately from the filtration unit. In this case, both the skimmer pump for the protein skimmer and the circulation pump for water circulation can be included in the filtration unit, or only the circulation pump can be included in the filtration unit.

Furthermore, in this embodiment, a skimmer pump configured to mix air bubbles with water and supply them to the skimmer cylinder is used. However, the present invention is not limited to that. In the present invention, a so-called wood-stone-type protein skimmer in which air bubble generating means, such as, e.g., a woodstone, is disposed inside a skimmer cylinder into which water flows can be used.

Also, in the aforementioned embodiment, one aquarium is divided into a nurturing zone and a filtering zone (purifying zone) by a partition wall, but it is not limited to that. In the present invention, it can be configured such that a box for a filtering zone is attached later in an aquarium main body so that the aquarium main body forms a nurturing zone and the box for a filtering zone forms a filtering zone. Furthermore, even in the case of forming a filtering zone by attaching a filtering zone box, in the same manner as in the aforementioned embodiment, the filtering zone and the filtration unit can be constituted by separate members.

Additionally, in the aforementioned embodiment, the explanation was made with reference to an example in which the present invention is applied to an aquarium system for aquatic organisms, but the present invention is not limited to it. The present invention can also be applied to an aquarium system for aquatic organisms, such as, e.g., fresh water fish living in fresh water.

In the filtration unit 3 of the aforementioned embodiment, a cooling device can be connected. In other words, a tube connected to the discharge port 83 of the circulation pump 81 can be pulled out of the filtration unit 3, and the pulled out end portion of the tube is connected to an inlet opening of a cooling device and a tube connected to an outlet opening of the cooling device is pulled into the filtration unit 3, and the pulled-in end portion of the tube is connected to the upper outlet opening 32 of the filtration unit 3. With this structure, some of the water discharged from the circulation pump 81, after being cooled by passing through the cooling device, is supplied to the nurturing zone 11.

This application claims priority to Japanese Patent Application No. 2008-132670 filed on May 21, 2008, the entire disclosure of which is incorporated herein by reference in its entirety.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

INDUSTRIAL APPLICABILITY

The aquarium system for aquatic organisms according to the present invention can be applied to an equipment for nurturing aquarium fish, etc.

DESCRIPTION OF SYMBOLS

1 . . . aquarium
11 . . . nurturing zone
12 . . . filtering zone (purifying zone)
2 . . . partition wall
3 . . . filtration unit (purification unit)
4 . . . casing (mounting frame)
50 . . . filtration device
70 . . . protein skimmer
81 . . . circulation pump
84 . . . wiring/tubing accommodation groove
85 . . . skimmer pump

The invention claimed is:
1. An aquarium system for aquatic organisms, comprising:
an aquarium;
a partition wall arranged to divide an inside of the aquarium into a nurturing zone and a purifying zone;
a circulation pump arranged to circulate water between the nurturing zone and the purifying zone; and at least one purifying device selected from a filter for filtering water by making the water pass through a filtering material, a protein skimmer for removing proteins contained in the water by making the proteins adhere to air bubbles, and an ultraviolet light irradiator for sterilizing the water by irradiating ultraviolet light to the water, wherein the circulation pump and the at least one purifying device constitute a unit member, wherein the unit member is mounted on a mounting frame to thereby form a purification unit, wherein the purification unit is received within the purifying zone of the aquarium adjacent to the partition wall without being secured to the partition wall or to the aquarium so that the purification unit is accommodated in the purifying zone in a removably inserted manner, wherein the mounting frame is constituted by a casing configured to accommodate the unit member in a removably inserted manner, wherein the casing has a pump chamber and the circulation pump is disposed in the pump chamber, and wherein an opening portion for removing and inserting the unit member is formed on a wall of the casing corresponding to the pump chamber.

2. The aquarium system for aquatic organisms as recited in claim 1, wherein the unit member includes the protein skimmer and a skimmer pump for supplying air bubble mixed water to the protein skimmer.

3. The aquarium system for aquatic organisms as recited in claim 2, wherein the skimmer pump is disposed in the pump chamber.

4. The aquarium system for aquatic organisms as recited in claim 1, wherein the purification unit is accommodated in at least a part of the purifying zone in a fitted manner.

5. The aquarium system for aquatic organisms as recited in claim 1, wherein the unit member includes the filter and the protein skimmer.

6. The aquarium system for aquatic organisms as recited in claim 1, wherein the unit member includes all members disposed in the purifying zone.

7. The aquarium system for aquatic organisms as recited in claim 1, wherein the mounting frame is provided with a wiring/tubing accommodation groove formed on an outer surface of the mounting frame and extended from the purifying zone to an upper edge portion of the aquarium, and wherein a power cord is accommodated in the wiring/tubing accommodation groove and taken out from the purifying zone to an outside of the aquarium.

* * * * *